(12) United States Patent
Tsai

(10) Patent No.: US 7,693,408 B1
(45) Date of Patent: Apr. 6, 2010

(54) CAMERA WITH MULTIPLE FOCUS CAPTURES

(75) Inventor: Richard Tsai, Arcadia, CA (US)

(73) Assignee: Siimpel Corporation, Arcadia, CA (US)

( * ) Notice: Subject to any disclaimer, the term of this patent is extended or adjusted under 35 U.S.C. 154(b) by 783 days.

(21) Appl. No.: 11/549,414

(22) Filed: Oct. 13, 2006

(51) Int. Cl.
*G03B 17/00* (2006.01)
*G03B 3/00* (2006.01)
*G03B 17/38* (2006.01)
*H04N 5/76* (2006.01)
*H04N 5/232* (2006.01)
*G03B 13/00* (2006.01)

(52) U.S. Cl. .................. 396/79; 396/96; 396/263; 396/502; 348/231.99; 348/345; 348/353

(58) Field of Classification Search .................. 396/263, 396/79
See application file for complete search history.

(56) References Cited

U.S. PATENT DOCUMENTS

| 4,816,858 | A | * | 3/1989 | Watanabe et al. | ............. 396/96 |
| 6,096,964 | A | * | 8/2000 | Ghamaty et al. | ............. 136/201 |
| 7,027,087 | B2 | * | 4/2006 | Nozaki et al. | ........... 348/231.99 |
| 7,187,413 | B2 | * | 3/2007 | Alderson | .................... 348/353 |
| 7,307,653 | B2 | * | 12/2007 | Dutta | ...................... 348/208.7 |
| 2004/0070679 | A1 | * | 4/2004 | Pope | ..................... 348/231.99 |
| 2005/0023435 | A1 | * | 2/2005 | Yasuda | ..................... 250/201.2 |
| 2006/0198622 | A1 | * | 9/2006 | Xu et al. | ....................... 396/89 |
| 2007/0216796 | A1 | * | 9/2007 | Lenel et al. | .................. 348/345 |

* cited by examiner

*Primary Examiner*—Melissa J Koval
(74) *Attorney, Agent, or Firm*—Haynes and Boone, LLP

(57) ABSTRACT

A method and system provides a series of images having different focuses. The method can include storing at least one image in a buffer while an autofocus mechanism is determining a focus of the camera. Then, at least one image can be stored in the buffer after the autofocus mechanism has determined the focus of the camera. Images in the buffer can be transferred to a flash memory. In this manner, a plurality of images, each generally having a different focus, can be provided and the user can select an image having a desired focus.

22 Claims, 4 Drawing Sheets

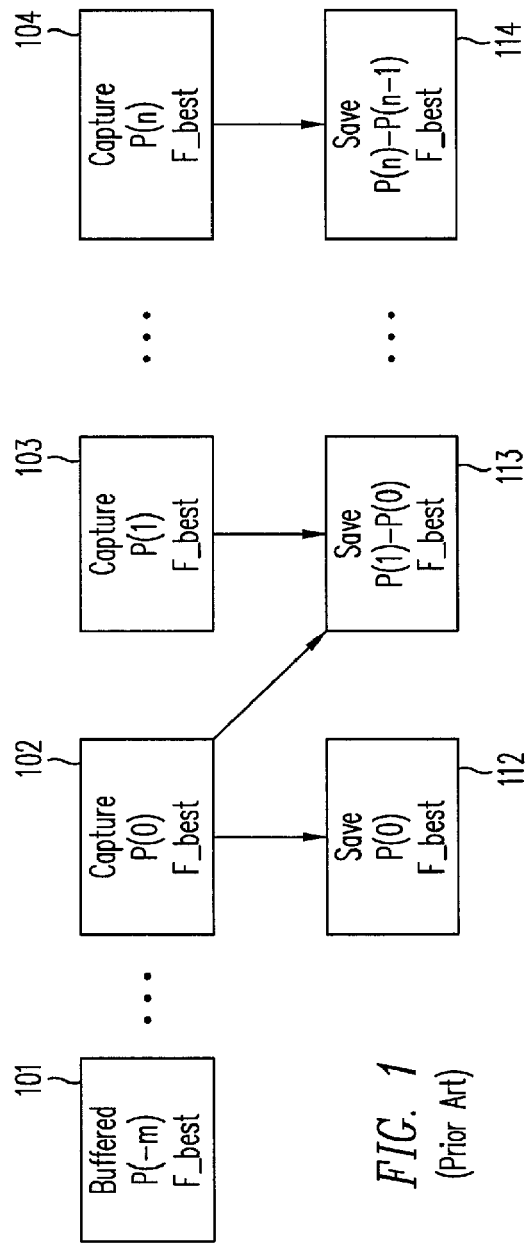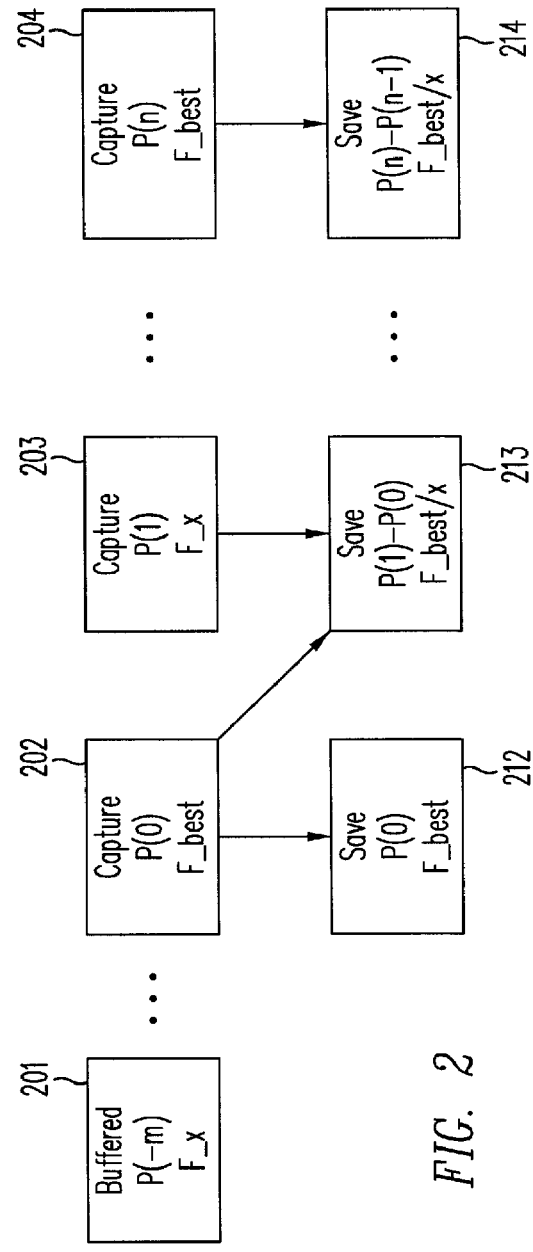
FIG. 1 (Prior Art)
FIG. 2

CAMERA WITH MULTIPLE FOCUS CAPTURES

TECHNICAL FIELD

The present invention relates generally to digital imaging. The present invention relates more particularly to a camera that is configured to capture a series of images with different focuses.

BACKGROUND

The use of autofocus mechanisms in contemporary digital cameras is well known. Such autofocus mechanisms attempt to determine the best focus so that resultant photographs are acceptable to the camera's user. That is, an autofocus mechanism attempts to provide the sharpest focus for that portion of the image that is likely to be considered the most important part of the image by the user.

Sometimes users may want to have several images taken at various focuses simultaneously. Further, determination of the best focus is an inherently subjective process. Assumptions are made in the development and implementation of the autofocusing algorithm regarding what is to be considered the best focus. For example, assumptions are made regarding the portion of the image which is to be used for sharpness determination. Typically, the center of the image is assumed to be the most important to the user. Because of this, the center of the image is typically used for sharpness determination and thus the center of the image is typically the portion thereof for which the focus is the sharpest. Assumptions are also made regarding the degree of sharpness that is to be considered acceptable.

Further, determination of the best focus is not an instantaneous process. The camera must often move a lens or lens assembly through a number of different positions in order to determine the best focus. This is essentially a trial and error process, wherein many focusing lens positions are tested to determine which focusing lens position provides the best focus.

Because the process is subjective and because obtaining the best focus takes time, an image may be taken without the focus that a particular user most desires. For example, this can occur simply because the user disagrees with the subjective aspects of the autofocus algorithm. Perhaps the autofocus mechanism provided sharpest focus for the foreground, when the user desired sharpest focus for the background or visa-versa. In either instance, the focus provided by the camera is not the focus that the user most desires.

Undesirable focus can also occur when the user depresses the shutter release before the camera has determined the best focus. The autofocus mechanism can still be moving the lens or lens assembly in an attempt to determine the best focus when the image is captured. Perhaps the autofocus mechanism has already tried a lens position that the user would have found provided acceptable focus, but the autofocus mechanism is still testing other positions.

In any event, it would beneficial to provide the user with a plurality of different images, each having a different focus. In this manner, the user can select which image or images (and consequently, which focus or focuses) are most desirable.

BRIEF SUMMARY

A method for taking or capturing a series of images having different focuses is disclosed. According to an example of an embodiment of the present invention, a series of images can be temporarily stored wherein at least one of the images was taken before a shutter release was actuated and at least one of the images was taken after the shutter release was actuated. After the shutter release has been actuated, then at least one of the images that was taken before the shutter release was actuated and at least one of the images that was taken after the shutter release was actuated can be permanently stored.

According to an example of an embodiment of the present invention, a method for taking images can comprise storing at least one image taken while an autofocus mechanism is determining a focus of a camera and storing at least one image taken after the autofocus mechanism has determined the focus of the camera. Some or all of the stored images can have different focuses.

More particularly, storing at least one image taken while an autofocus mechanism is determining a focus of a camera can comprise storing at least one image in a temporary memory, such as a buffer. Similarly, storing at least one image after the autofocus mechanism has determined the focus of the camera can comprise storing at least one image in the temporary memory. Images taken while the autofocus mechanism was determining the focus and images taken after the autofocus mechanism determined the focus can subsequently be transferred to a flash memory.

Thus, the method can further comprise sensing that a shutter release has been actuated and then moving at least one image that was stored while the autofocus mechanism was determining the focus of a camera from a temporary memory (such as a buffer) to a permanent memory (such as a flash memory) and moving at least one image that was stored after the autofocus mechanism had determined the focus of the camera from the temporary memory to the permanent memory.

Actuating the shutter release can cause a plurality of images from the buffer to be stored in the flash memory. Data compression can be used to store the images. For example, the images can be first stored in a temporary memory without using data compression and then subsequently moved to a permanent memory where they are stored with data compression. A major image can be followed by a plurality of minor images.

According to an example of an embodiment of the present invention, a camera can comprise a shutter release, a buffer configured to store at least one image therein prior to depressing the shutter release and configured to store at least one image therein after depressing the shutter release, and a permanent memory configured to store images from the buffer. The buffer can be configured to store a plurality of images therein prior to depressing the shutter release. The buffer can be configured to store either only one image or a plurality of images therein after depressing the shutter release. The buffer can comprise a comparatively fast memory.

The permanent memory can comprise a comparatively slow memory. The buffer can comprise either a volatile or a non-volatile memory. Similarly, the permanent memory can comprise either a volatile or a non-volatile memory. According to an example of an embodiment of the present invention, the buffer comprises a volatile memory and the permanent memory comprises a non-volatile memory.

According to an example of an embodiment of the present invention, a camera comprises an autofocus mechanism, a memory, and a controller configured to store at least one image in the memory while the autofocus mechanism is determining a focus of the camera and to store at least one image in the memory after the autofocus mechanism has determined a focus. The controller can be configured to store a plurality of images in the memory while the autofocus mechanism is determining a focus. A micro-electromechanical system (MEMS) actuator can be used by the autofocus mechanism to move a lens assembly to effect focus.

By providing a plurality of images, each of which likely has a different focus, a user is given the opportunity to select the image that has the most desirable focus. This may not necessarily be the first image taken after the shutter release is actuated.

This invention will be more fully understood in conjunction with the following detailed description taken together with the following drawings.

BRIEF DESCRIPTION OF THE DRAWINGS

FIG. 1 is a diagram showing a contemporary method for capturing a series of images;

FIG. 2 is a diagram showing a method for capturing a series of images having different focuses according to an example of an embodiment of the present invention, wherein one major image is captured and a plurality of minor images are captured;

Embodiments of the present invention and their advantages are best understood by referring to the detailed description that follows. It should be appreciated that like reference numerals are used to identify like elements illustrated in one or more of the figures.

DETAILED DESCRIPTION

Figure 3:
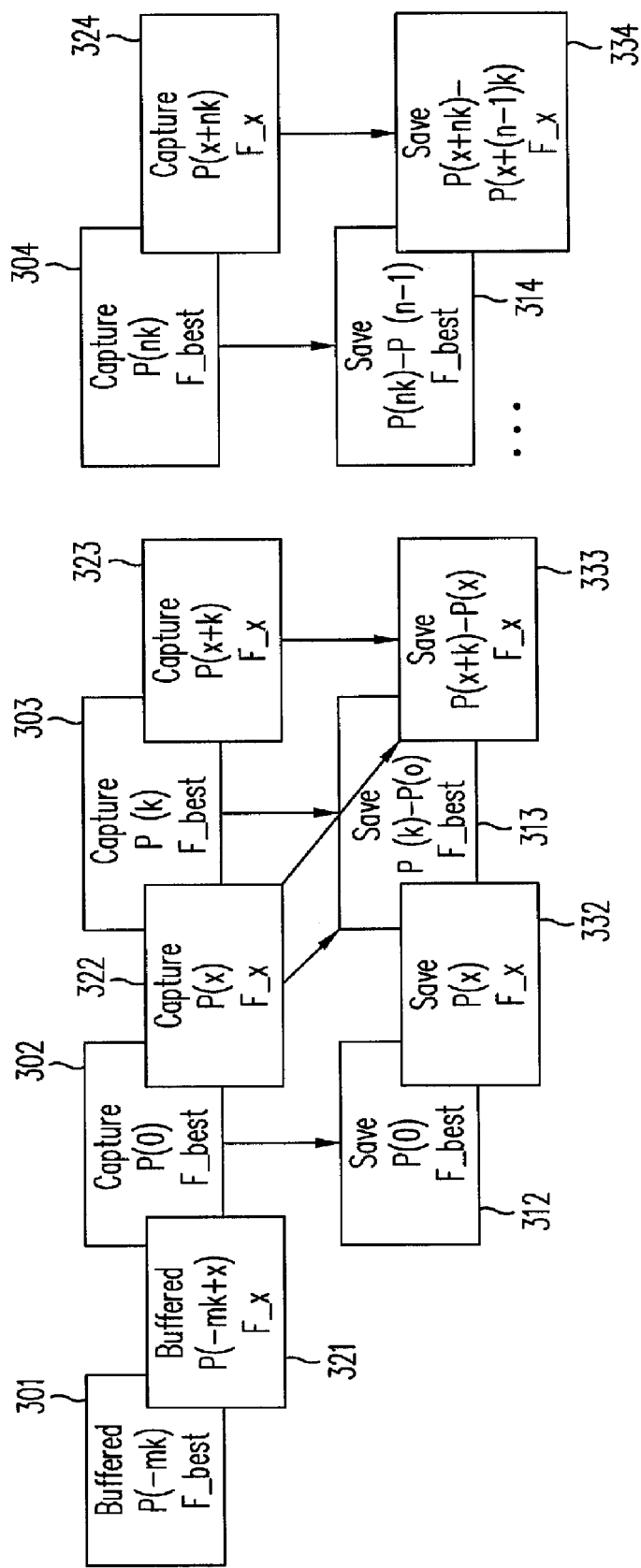
FIG. 3 is a diagram showing a method for capturing a series of images having different focuses according to an example of an embodiment of the present invention, wherein a plurality of major images are captured and a plurality of minor images are captured.

A method and system for capturing multiple focuses with a camera are disclosed. According to an exemplary embodiment of this invention, each time that the shutter release is actuated by a user, a plurality of images are stored. Some of these images can have been captured immediately prior to actuating the shutter release (such as while the autofocus mechanism is attempting to determine the best focus) and some of these images can have been captured in response to actuating the shutter release. Each stored image will generally have a different focus. Capturing a series of images having different focuses allows a user to select an image having a desired focus.

When the shutter release of a contemporary digital camera is actuated, a single image is first stored in a temporary memory, i.e., a buffer, and subsequently moved to a permanent memory, e.g., a flash memory. Since only a single image is provided, the user does not have the ability to select from among a plurality of different focuses. By way of contrast, at least one embodiment of the present invention provides the user with this ability.

The term shutter release, as used herein, can be defined to include any mechanism, whether mechanical, electrical, or a combination of both, that defines when an image is to be captured, typically via human operation thereof. Thus, a shutter release does not have to have any mechanical components, and more particularly does not have to operate a shutter.

As used herein, temporary memory can refer to memory where images can be stored for a period of time that is substantially shorter that the time for which they are stored in permanent memory. In some instances, images are stored in temporary memory for a period of time that can be less than one second and can be up to several seconds. Temporary memory is typically substantially faster than permanent memory (has shorter read/write times), is typically of lower capacity (can hold fewer images) than permanent memory, and is typically volatile.

As used herein, permanent memory can refer to memory where images can be stored for a period of time that is substantially longer than the time for which they are stored in the temporary memory. Images can often be stored in a permanent memory indefinitely, e.g., for days, weeks, months or possibly even longer. A flash memory, such as an electronically erasable programmable read only memory (EEPROM), is one example of a permanent memory. Permanent memory is typically substantially slower than temporary memory (has longer read/write times), is typically of higher capacity (can hold more images) than temporary memory, and is typically non-volatile.

Permanent memory typically is not fast enough to accept images directly from an imaging sensor or processing circuitry. This is particularly true when a series of images are captured in a rapid sequence. Therefore, images are often first stored in faster temporary memory and then more slowly transferred to permanent memory.

Further, later taken images may be stored in temporary memory while earlier taken images are processed, e.g., compressed, for storage in permanent memory. Thus, temporary memory can operate as a buffer for permanent memory.

The compression process can, for example, include the storage of a major image followed by a plurality of minor images in the permanent memory. The major image can be a raw image, an image compressed with lossless compression, or an image compressed with low or acceptable loss. The minor images can comprise information that is representative of the changes between the major image and each minor image.

According to an example of an embodiment of the present invention, a plurality of images are provided by constantly storing images in the buffer prior to the shutter release being actuated. After the shutter release is actuated, at least one more image is stored in the buffer and then all of the images stored in the buffer are moved to the flash memory.

Referring now to FIG. 1, according to contemporary practice only images having the best focus are stored in a buffer. Best focus is indicated by F_best in the boxes that represent buffered raw images 101-104. Such images are captured only after the shutter release is actuated. Generally, one image will be captured each time that the shutter release is actuated. Such images are at the focus deemed to the best focus by the camera's autofocus mechanism. No images are buffered prior to depressing the shutter release.

Once an image is captured and stored in the temporary storage defined by the buffer, it can be transferred to permanent storage (such as a EEPROM flash memory or the like), as indicated by saved images (P(0) to P(n)-P(n−1)) 112-114.

Data compression can be used to facilitate more efficient use of the permanent memory. Thus, image 112 can be a major image and image 113 can be a minor image. The vertical arrow from image 102 to image 112 indicates that image 102 in the temporary memory is being stored as image 112 in the permanent memory and is being stored as a major image. The diagonal arrow from image 102 to image 113 indicates that image 102 in the temporary memory is providing base data for image 113 in the permanent memory, while image 103 from temporary memory is providing difference data (deltas) for image 113, such that image 113 is being stored as a minor image.

According to contemporary practice, images are only captured and buffered in response to actuation of the shutter release. More particularly, no images from prior to shutter release actuation are stored in permanent memory.

By way of contrast, according to an example of an embodiment of the present invention, images are captured and buffered prior to actuation of the shutter release, as well as in response thereto. For example, both images from prior to shutter release actuation and from after shutter release actuation can be stored in permanent memory. In this manner, a series of images having different focuses can be provided.

Referring now to FIG. 2, according to an example of an embodiment of the present invention buffered image 201 is taken prior to actuation of the shutter release. Any desired number of such images can be taken prior to actuation of the shutter release. Of course, the number of images taken prior to actuation of the shutter release may be limited by the size of the memory, e.g., the buffer.

Images 202-204 are taken after actuation of the shutter release. As before, data compression can be used where images 212 and 214 are major images that are stored in the permanent memory and image 213 is a minor image that is stored in the permanent memory.

When the shutter release is actuated, then all of some of the buffered images can be transferred from temporary memory to permanent memory. Thus, at least some of the images captured prior to actuation of the shutter release can be stored in permanent memory.

The focus of buffered image 201, as well as of any other images taken prior to actuation of the shutter release, is not necessarily the best focus (as determined by the autofocus mechanism), as indicted by F_x. However, the focus of buffered image 201, or of any of the images taken prior to actuation of the shutter release, may be preferable to the focus of any image taken after actuation of the shutter release, at least in the subjective opinion of the user.

Referring now to FIG. 3, the capture of more images are shown. Images 301 and 321 are images that are captured prior to actuation of the shutter release and are stored in the temporary memory. Images 302-304 and 322-324 are images that are captured after actuation of the shutter release and are stored in the temporary memory. Images 312, 314, 332, and 334 are major images that are stored in permanent memory. Images 313 and 333 are minor images that are stored in permanent memory.

Images 301-304 and 312-314 can be viewed as one set of images that result from one actuation of shutter release and images 321-324 and 332-334 can be viewed as another set of images that result from another actuation of shutter release. For each actuation of shutter release, both images that were stored in temporary memory prior to actuation of the shutter release and images that were stored in temporary memory after the shutter release was actuated can be moved to the permanent memory.

Figure 4:
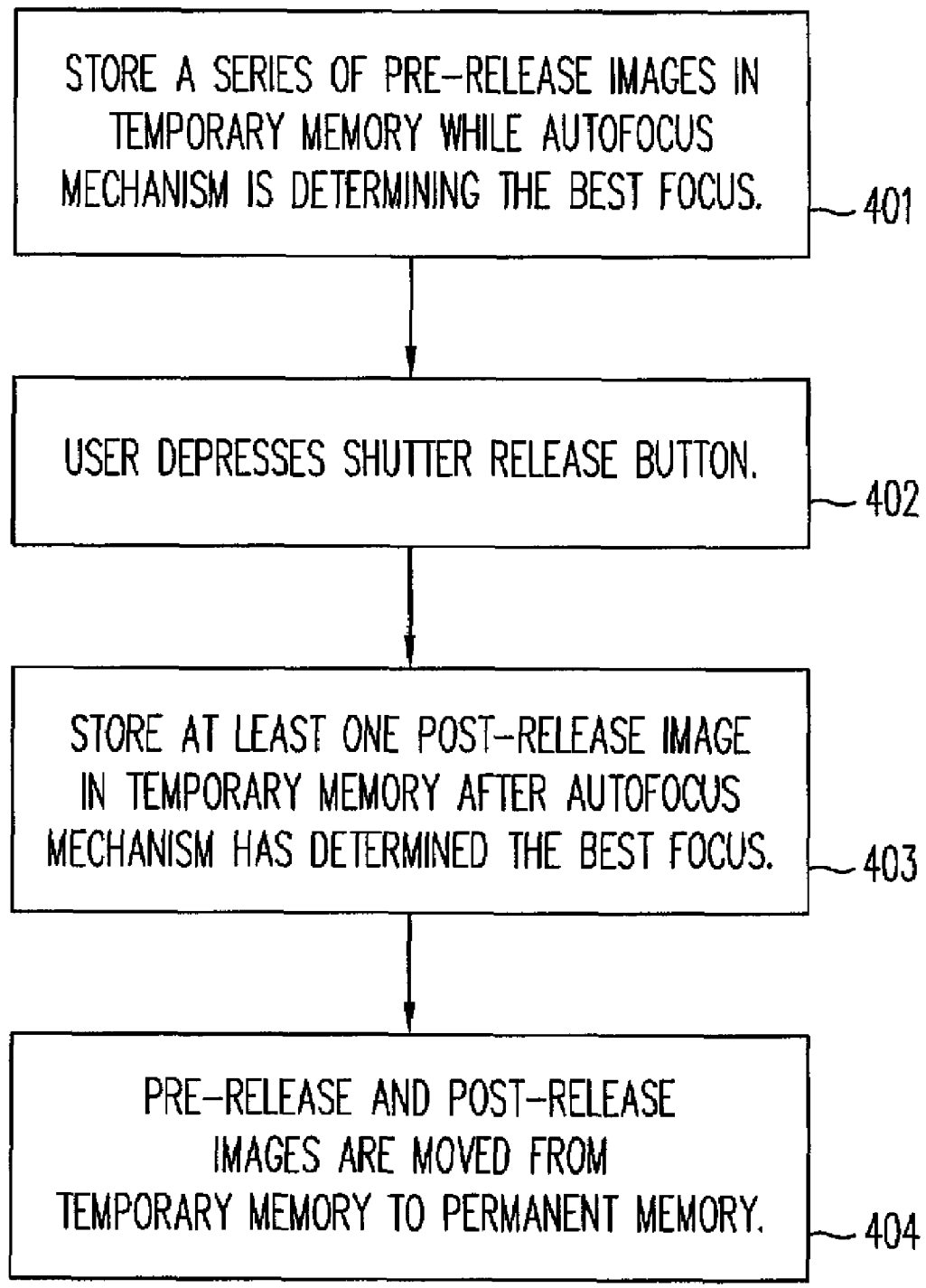
FIG. 4 is a flow chart showing a method for capturing a series of images having different focuses according to an example of an embodiment of the present invention.

Referring now to FIG. 4, according to an example of an embodiment of the present invention a series of pre-release (prior to actuation of the shutter release) images are stored in temporary memory while the autofocus mechanism of the camera is determining the focus, as indicated in block 401.

The shutter release is actuated, such as by depressing the shutter release button of the camera, as indicated in block 402.

After the shutter release is actuated, then at least one post-release (subsequent to actuation of the shutter release) image is stored in the temporary memory, as indicated in claim 403. One post-release image can be stored in the temporary memory at this time or a series of post-release images can be stored in the temporary memory at this time.

The pre-release images and the post-release images are moved from the temporary memory to the permanent memory, as indicated in block 404. Generally, the pre-release images and the post-release image(s) will be move from the temporary memory to the permanent memory about as quickly as they can be processed for storage in the permanent memory. Such processing can include data compression.

Figure 5:
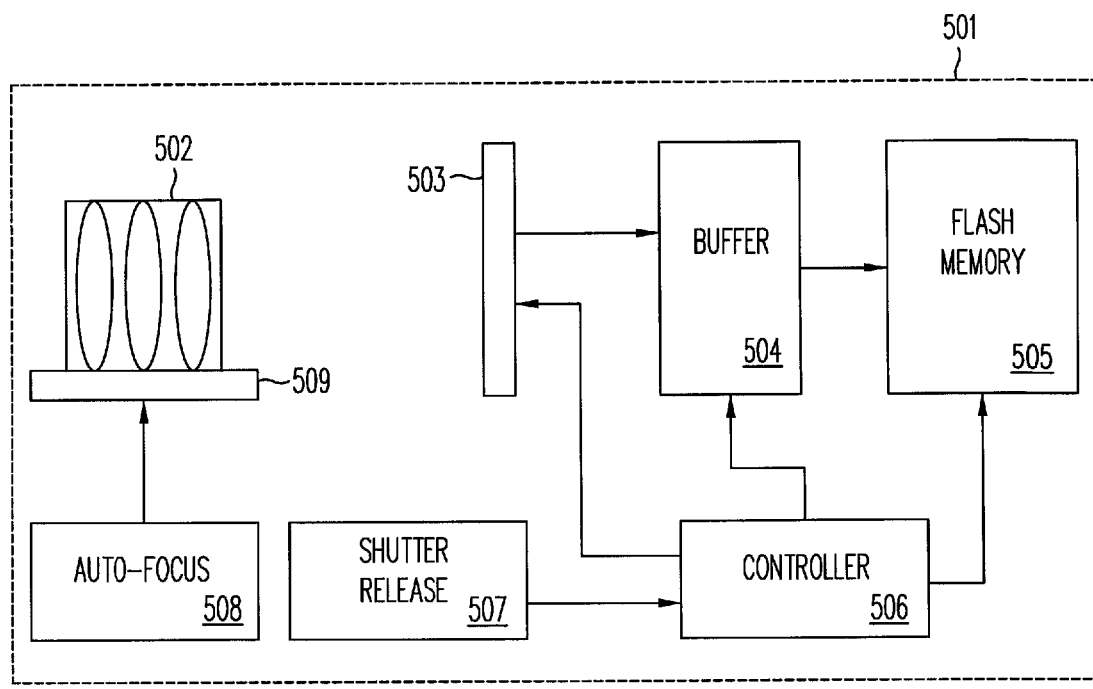
FIG. 5 is a block diagram showing a camera that is configured to capture a series of images having different focuses according to an example of an embodiment of the present invention.

Referring now to FIG. 5, according to an example of an embodiment of the present invention a camera 501 comprises a lens assembly 502 that is configured to focus an image upon imaging sensor 503. An autofocus mechanism 508 moves lens assembly 502 in an attempt to provide best focus.

According to an example of an embodiment of the present invention, a MEMS actuator 509 effects movement of lens assembly 502 for focusing. The use of a MEMS actuator, particularly with a miniature lens assembly that is suitable for use in a personnel electronic device such as a cellular telephone, can facilitate movement of the lens assembly vary rapidly. Thus, a plurality of images, each of substantially the same scene, can be taken with different focuses.

Image data from imaging sensor 503 is provided to temporary memory or buffer 504. When a shutter release 507 is actuated, then controller 506 causes image(s) stored in buffer 504 prior to actuation of shutter release 507 and images stored in buffer 504 after actuation of shutter release 507 to be transferred to permanent or flash memory 505. Thus, for each actuation of shutter release 507, flash memory 505 can contain one or more pre-release images and one or more post-release images.

Figure 6:
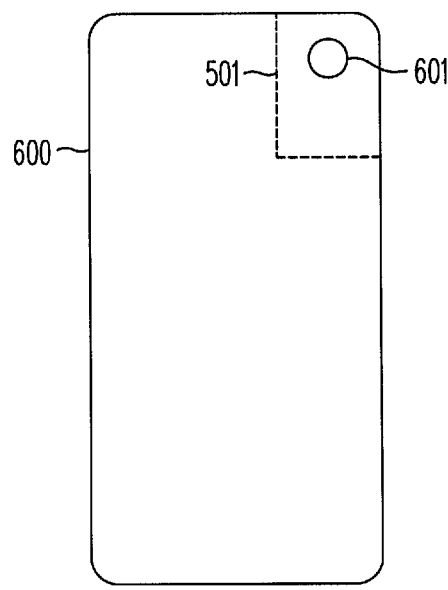
FIG. 6 is a back view of a cellular telephone having a camera that is configured to capture a series of images having different focuses, such as the camera of FIG. 5.

Referring now to FIG. 6, according to one example of an embodiment of the present invention camera 501 is disposed within a personnel electronic device, such as cellular telephone 600. As those skilled in the art will appreciated, camera 501 is suitable for use in a variety of personnel electronic devices such as laptop computers, notebook computers, personnel digital assistants (PDAs), and pocket PCs. Camera 501 can receive light through window 601. Window 601 can be a lens, as well as a window.

In view of the foregoing, a camera with multiple focus captures is provided. Thus, a user can choose a desired image from among a plurality of stored images. Each of the different ones of the plurality of stored images is likely to have a different focus, thus providing the user with a selection of different focuses to choose from.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method for capturing images, the method comprising:
   temporarily storing a series of images, at least one of the images being captured while an autofocus mechanism is determining a focus and before a shutter release has been actuated and at least one of the images being captured after the shutter release has been actuated;
   after a shutter release has been actuated, performing the following:

permanently storing at least one image that was taken before the shutter release was actuated; and permanently storing at least one image that was taken after the shutter release was actuated.

2. A method for capturing images, the method comprising:

storing at least one image that was captured while an autofocus mechanism is determining a focus of a camera; and storing at least one image that was captured after the autofocus mechanism has determined the focus of the camera.

3. The method as recited in claim 2, wherein storing at least one image that was captured while an autofocus mechanism is determining a focus of a camera comprises storing at least one image in a temporary memory.

4. The method as recited in claim 2, wherein storing at least one image that was captured while an autofocus mechanism is determining a focus of a camera comprises storing at least one image in a buffer.

5. The method as recited in claim 2, wherein storing at least one image after the autofocus mechanism has determined the focus of the camera comprises storing at least one image in a temporary memory.

6. The method as recited in claim 2, wherein storing at least one image after the autofocus mechanism has determined the focus of the camera comprises storing at least one image in a buffer.

7. The method as recited in claim 2, further comprising:

sensing that a shutter release has been actuated;

performing the following in response to actuation of the shutter release:

moving at least one image that was stored while the autofocus mechanism was determining the focus of the camera from a temporary memory to a permanent memory; and moving at least one image that was stored after the autofocus mechanism had determined the focus of the camera from the temporary memory to the permanent memory.

8. The method as recited in claim 2, further comprising:

sensing that a shutter release has been actuated;

performing the following in response to actuation of the shutter release:

moving at least one image that was stored while the autofocus mechanism was determining the focus of the camera from a buffer to a flash memory; and moving at least one image that was stored after the autofocus mechanism had determined the focus of the camera from the buffer to the flash memory.

9. The method as recited in claim 2, wherein actuating a shutter release causes a plurality of images from a buffer to be stored in a flash memory.

10. The method as recited in claim 2, wherein actuating a shutter release causes all of the images stored in a buffer to be stored in a flash memory.

11. The method as recited in claim 2, wherein data compression is used to store the images.

12. The method as recited in claim 2, wherein the images are first stored in a temporary memory without using data compression and are subsequently moved to a permanent memory where they are stored with data compression.

13. The method as recited in claim 2, wherein storing at least one image comprises storing a major image followed by a plurality of minor images.

14. A camera comprising:

a shutter release;

a buffer configured to store at least one image therein prior to actuating the shutter release and configured to store at least one image therein after actuating the shutter release;

a permanent memory configured to store images from the buffer;

a lens assembly for focusing the camera; and a MEMS actuator for moving the lens assembly.

15. The camera as recited in claim 14, wherein the buffer is configured to store a plurality of images therein prior to depressing the shutter release.

16. The camera as recited in claim 14, wherein the buffer is configured to store only one image therein after depressing the shutter release.

17. The camera as recited in claim 14, wherein the buffer comprises a comparatively fast memory as compared to the permanent memory.

18. The camera as recited in claim 14, wherein the permanent memory comprises a comparatively slow memory as compared to the buffer.

19. The camera as recited in claim 14, wherein the buffer comprises a volatile memory.

20. The camera as recited in claim 14, wherein the permanent memory comprises a non-volatile memory.

21. A camera comprising:

an autofocus mechanism;

a memory; and a controller configured to store at least one image in the memory while the autofocus mechanism is determining a focus of the camera and configured to store at least one image in the memory after the autofocus mechanism has determined a focus;

a lens assembly for focusing the camera; and a MEMS actuator for moving the lens assembly.

22. The camera as recited in claim 21, the controller is configured to store a plurality of images in the memory while the autofocus mechanism is determining a focus of the camera.

* * * * *